United States Patent [19]
John et al.

[11] Patent Number: 6,147,978
[45] Date of Patent: Nov. 14, 2000

[54] METHOD AND APPARATUS FOR PREVENTING MESSAGE COLLISIONS IN A HALF-DUPLEX COMMUNICATION SYSTEM

[75] Inventors: Johnny K. John; Nikolai K. N. Leung, both of San Diego, Calif.

[73] Assignee: Qualcomm Incorporated, San Diego, Calif.

[21] Appl. No.: 08/780,764

[22] Filed: Jan. 8, 1997

[51] Int. Cl.[7] .............................. G06F 11/00; H04B 7/14; H04J 3/16
[52] U.S. Cl. .......................... 370/279; 370/236; 370/468
[58] Field of Search .................................. 370/280, 279, 370/235, 294, 447, 448, 293, 445, 468

[56] References Cited

U.S. PATENT DOCUMENTS

| | | | |
|---|---|---|---|
| 4,736,249 | 4/1988 | Iizuka et al. | 358/257 |
| 4,742,514 | 5/1988 | Goode et al. | 379/279 |
| 4,750,165 | 6/1988 | Champagne | 370/24 |
| 5,282,238 | 1/1994 | Berland | 379/58 |
| 5,526,355 | 6/1996 | Yang et al. | 370/85.3 |
| 5,561,844 | 10/1996 | Jayapalan et al. | 455/33.2 |
| 5,726,976 | 3/1998 | Thompson et al. | 370/229 |
| 5,734,643 | 3/1998 | Rondeau | 370/279 |
| 5,790,641 | 8/1998 | Chan et al. | 379/100.17 |
| 5,896,443 | 4/1999 | Dichter | 379/93.08 |

FOREIGN PATENT DOCUMENTS

| | | | |
|---|---|---|---|
| 2246268 | 1/1992 | United Kingdom | H04N 1/00 |
| 2286739 | 8/1995 | United Kingdom | H04N 2/32 |

OTHER PUBLICATIONS

S. Dimolitsas et al., "Real–time Transmission of Group 3 Facsimile Over Interconnected Public Switched Digital Mobile Satellite Networks", *Comsat Technical Review*, 1992, pp. 125–145.

*Primary Examiner*—Hassan Kizou
*Assistant Examiner*—Hanh Nguyen
*Attorney, Agent, or Firm*—Philip R. Wadsworth; Sean English; Thomas R. Rouse

[57] ABSTRACT

In a half-duplex communication system in which additional delays in the communication channel may cause a message collision between a message and a response, a timer based collision prevention circuit is utilized to prevent the message collision. The collision prevention circuit determines if the message transmitted by a communication device will be repeated. If the message is to be repeated, the collision prevention circuit sets a countdown collision timer to a predetermined period of time shorter than the shortest repetition interval of the repeated message. A response is only sent to the communication device if the collision timer has not expired. If the timer expires, the collision prevention circuit waits for the message to be retransmitted by the source device before sending the response to the communication device.

9 Claims, 3 Drawing Sheets

METHOD AND APPARATUS FOR PREVENTING MESSAGE COLLISIONS IN A HALF-DUPLEX COMMUNICATION SYSTEM

BACKGROUND OF THE INVENTION

I. Field of the Invention

The present invention relates to data transmission. More particularly, the present invention relates to a novel and improved method for preventing message collisions in a half-duplex communication system.

II. Description of the Related Art

In a half-duplex communication system, multiple communicating devices are connected to a single communication channel. One such system is a fax communication system in which two fax machines send messages across a telephone line. Half-duplex devices such as fax machines are capable of only transmitting or receiving messages at any particular instant. These devices cannot transmit and receive data simultaneously. If two devices transmit signals toward each other simultaneously and neither device is listening, the devices will not receive the other's message. This event is known as a message collision.

Most half-duplex communication systems are designed to minimize message collisions to improve the quality of the communications. These systems employ a variety of schemes to avoid message collisions. Some of these schemes require a certain quality in the communication channel. As the communication channel deteriorates, there may be an increased likelihood of message collisions. Other schemes use special timing and synchronization to avoid message collisions. For these schemes, increased delays in the communication channel may cause the system to fail.

A fax communication system is an example of a half-duplex communication system which relies on the timing and synchronization between the two communicating fax machines to avoid message collisions. The fax machines communicate with each other through a standard public switched telephone network (PSTN) channel which has known channel quality and delay characteristics. When a non-standard PSTN channel, such as a digital communication system or a satellite link, is inserted between the two fax machines the increased transmission delays can cause the fax interactions to fail because of message collisions.

A digital communication system or satellite link is incorporated with the half-duplex communication system to extend the range of coverage, allow mobility in the communicating devices, and increase interconnectivity between different communicating devices. An exemplary digital communication system which can be used in conjunction with a fax communication system is a wireless code division multiple access (CDMA) system operating in the cellular or personal communication system (PCS) band or a GLOBAL-STAR satellite communication system. These digital communication systems have inherent processing delays resulting from the large amount of digital signal processing and from transmission delays. These digital communication systems also employ central base stations to combine or multiplex signals from many communicating devices into a common transmission signal. The resultant overall delay can be both intolerably long and unpredictable.

Throughout the specification of the present invention, a syntax structure is maintained to clarify the discussion of the invention. In describing communications between two devices, the term 'message' is used to denote a communication from a source device to a destination device. This 'message' may or may not be retransmitted by the source device. The term 'response' is used to denote a communication from the destination device to the source device as the result of the earlier transmitted 'message'.

In a half-duplex communication system which utilizes a timing and synchronization scheme to avoid message collision, a source device desiring to communicate with a destination device on the same channel initiates the communication by sending out a message and waiting for a response from the destination device. After a predetermined length of time passes and if no response is received, the source device retransmits the message. This process is repeated for a specified number of times or until a response is received.

For a standard Group 3 fax communication system, the timing and synchronization between fax machines conform to behavior as specified in "ITU-T Recommendation T.30: Procedures for Document Facsimile Transmission in the General Switched Telephone Network", hereinafter referred to as the T.30 fax protocol. The T.30 fax protocol uses a number of modulation techniques for transmission of forward message data. In particular, parameter negotiation and handshaking between fax machines is accomplished using the modulation technique specified in "CCITT Recommendation V.21: 300 bps Duplex Modem Standard for use in the General Switched Telephone Network (GSTN)". The handshaking establishes the proper mode of communications between the fax machines.

For a T.30 fax system, a calling fax machine initiates a call by dialing the called fax machine and sending a calling tone (CNG). The called fax machine detects the incoming call and sends a called station identification tone (CED) back to the calling fax machine. The called fax machine then sends its digital identification signal (DIS) to the calling fax machine to inform the calling fax machine of its capabilities. Upon detection of the DIS signal, the calling fax machine sends a digital command signal (DCS) to inform the called fax machine of the capabilities the calling fax machine plans to use.

Other messages in addition to the above described initiation signals also take place between the fax machines during a call. For example, the training signals, information messages and termination messages are also part of a typical fax call.

A calling fax machine and a called fax machine send many messages between each other during a call. Messages are sent from either the calling fax machine or the called fax machine at various stages in a fax call. Since both calling and called fax machines can initiate messages, the discussion below describes the communications in terms of a source fax machine that initiates a message to a destination fax machine and a destination fax machine that reacts with a response back to the source fax machine without reference to calling or called fax machines. Some of the messages by the source fax machine must be repeated if no response is received for these messages.

The T.30 fax protocol specifies the procedure which must be followed when initiating a call between the fax machines. For example, the sequence and format of the CNG, CED, DIS, and DCS messages are specifically defined. The T.30 fax protocol also defines the messages which must be repeated if no response is received. Therefore, by monitoring the message format and having apriori knowledge of the signaling sequence, it is possible to determine which message will be repeated. A repeated message can be determined by analyzing the message and the state in a fax call in which it is received, as per the T.30 fax protocol.

To accommodate for unfavorable channel conditions, the T.30 fax protocol requires that certain unanswered messages between fax machines be repeated. If the source fax machine sends such a message to the destination fax machine, the source fax machine expects a response from the destination fax machine within a specified period of time. If no response is received after the specified period of time, the T.30 fax protocol requires the source fax machine to retransmit the message. The retransmissions continue until a response from the destination fax machine is received or an excessive number of attempts have been made.

The DIS and certain messages between the fax machines are repeated at a specified repetition interval if no response is detected. The T.30 fax protocol defines the shortest repetition interval within which a retransmission is allowed. For example, the T.30 fax protocol specifies the repetition interval for a fax machine operating in automatic mode to be 3.0 sec ±0.45 sec. This means that a fax machine conforming to the T.30 fax protocol will not retransmit a message within 2.55 sec of the prior message. Therefore, if such a fax machine receives a response within the shortest repetition interval of 2.55 sec, no collision will occur.

Under this T.30 fax timing scheme, long transmission delays in the communication channel can cause message collisions. In one scenario, the transmitting fax machine sends a message to the receiving fax machine and, because of the transmission delays, the response from the receiving fax machine takes more time than the repetition period to reach the transmitting fax machine. Since the transmitting fax machine does not receive the response in time, it retransmits the message. If the response from the receiving fax machine arrives at the same time the transmitting fax machine is retransmitting the message, a message collision results and the response will not be received by the transmitting fax machine.

The inability to account for unpredictable and long delays renders the communications between Group 3 fax machines on non-standard PSTN communication channels unreliable. A method is needed to prevent message collisions regardless of the amount of channel delay.

SUMMARY OF THE INVENTION

The present invention is a novel and improved method for preventing message collisions in a half-duplex communication system.

It is an object of the invention to prevent message collisions in a half-duplex communication system by utilizing a timer based collision prevention method and circuit. Upon receiving a message from the transmitting fax machine, a controller within the collision prevention circuit determines whether the message is to be repeated based on its knowledge of the T.30 fax protocol. If the message is to be repeated, the controller sets a countdown collision timer to a predetermined time period shorter than the shortest repetition interval of the message. A response directed toward the transmitting fax machine is only transmitted to the transmitting fax machine within the predetermined time period. Once the predetermined time period expires, the controller stores unforwarded responses until the message from the transmitting fax machine has been retransmitted and the countdown collision timer is reset. The controller then transmits any stored responses. By transmitting responses only within the shortest repetition interval, message collisions are prevented.

It is another object of the invention to prevent message collisions in a half-duplex communication system by utilizing a buffer. Incoming messages from a transmitting fax machine are analyzed to determine whether the message will be retransmitted. Responses from the receiving fax machine are stored in a buffer and transmitted to the source fax machines only after it has been determined, based on the collision timer, that a message collision will not occur.

The foregoing, together with other objects, features and advantages of this invention, will become more apparent when referring to the following specification, claims and the accompanying drawings.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
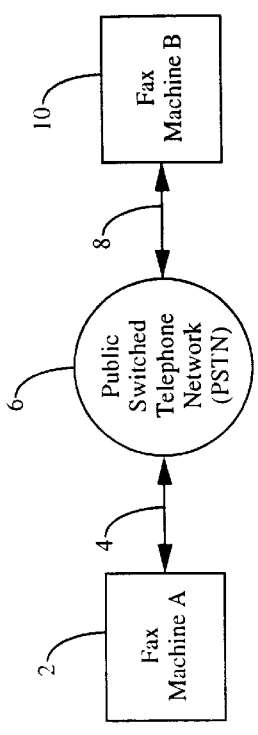
FIG. 1 is a block diagram of a standard half-duplex PSTN communication system in the prior art.

An exemplary half-duplex communication system of the prior art is shown in FIG. 1. One such system is a standard fax communication system. In this fax communication system, fax machine A 2 communicates with fax machine B 10 through public switched telephone network (PSTN) 6 via communication channels 4 and 8. Fax machine A 2 connects to PSTN 6 via communication channel 4. PSTN 6 connects to fax machine B 10 via communication channel 8. PSTN 16 acts as a switch to connect communication channel 4 to communication channel 8 to enable communications between the fax machines. Communication channels 4 and 8 are typically standard RJ-11 interfaces. The characteristics and delays of the RJ-11 interfaces and PSTN 6 are well defined and accounted for in the T.30 fax protocol.

Figure 2:
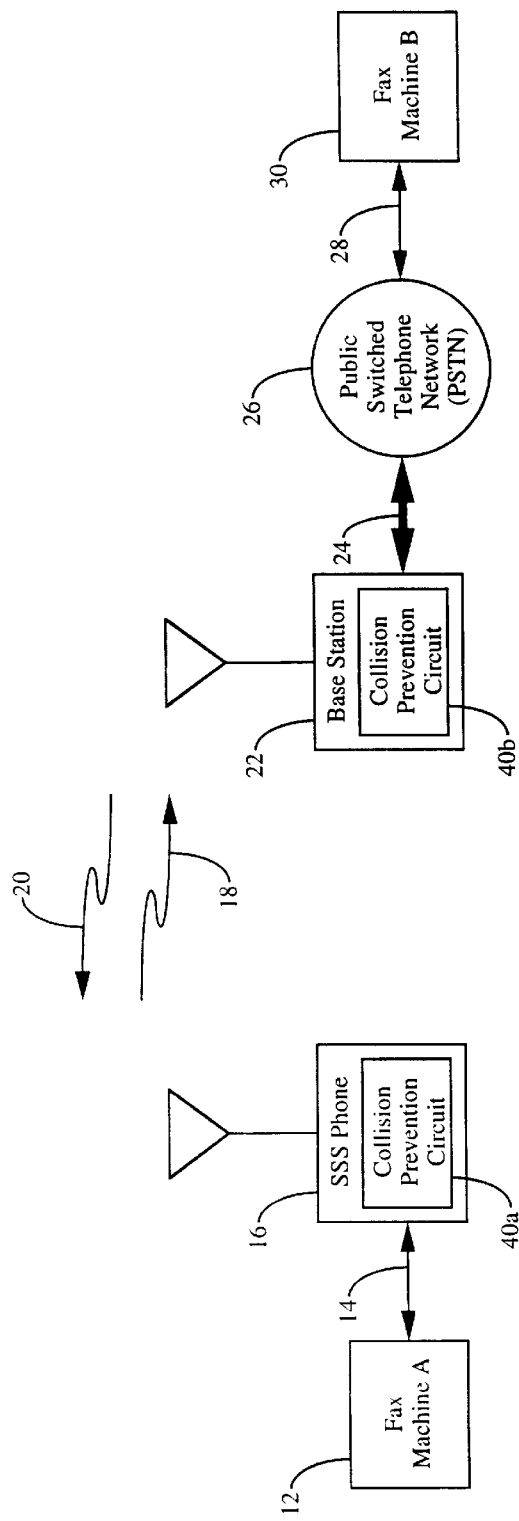
FIG. 2 is a block diagram of a communication system comprising a wireless CDMA digital communication system connected to the PSTN 16.

A communication system which employs a digital communication system is illustrated in FIG. 2. In this communication system, a digital communication system is connected in series with communication channels 14, 18, 20 and 24 between fax machine A 12 and fax machine B 30. The digital communication system can be a terrestrial wireless CDMA system or a satellite communication system such as the GLOBALSTAR system. Fax machine A 12 communicates with single subscriber system (SSS) phone 16 through communication channel 14. In the preferred embodiment, communication channel 14 is an RJ-11 interface. SSS phone 16 digitally processes the data and transmits the resultant output through over-the-air communication channel 18. Over-the-air communication channel 18 can be a satellite link or a terrestrial wireless link. Base station 22 receives the over-the-air signal, processes the signal, and sends the data to PSTN 26 through communication channel 24. Communication channel 24 is typically a standard T1/E1 line or any other similar transmission medium. PSTN 26 routes the data to FAX machine B 30 through communication channel 28.

The digital signal processing in SSS phone 16 and base station 22 delays the communications between fax machine A 12 and fax machine B 30. Signal transmissions through over-the-air communication channels 18 and 20 add to the overall delay. The total delay causes a message originating from the source fax machine to be received later by the destination fax machine. Likewise, a response from the destination fax machine arrives at the source fax machine at a later time.

In the exemplary embodiment, a timer based collision prevention method and circuit is utilized to prevent message collisions in a half-duplex communication system. Referring to FIG. 2, fax machine A 12 attempts to transmit a message to fax machine B 30. Fax machine A 12 is connected to SSS phone 16 and transmits the message to SSS phone 16. SSS phone 16 detects the message and determines if repeated messages will follow based on the state of the message as defined by the T.30 fax protocol. If the message will not be repeated, SSS phone 16 does not perform any special function since there is no potential for collision. If the message is to be repeated, SSS phone 16 will only transmit a response to fax machine A 12 within a time period in which no message collision will occur.

Timer based collision prevention circuits 40a and 40b residing within the half-duplex communication system are utilized to prevent message collisions between fax machine A 12 and fax machine B 30. Collision prevention circuit 40a resides in SSS phone 16 and collision prevention circuit 40b resides in base station 22. In the preferred embodiment, one collision prevention circuit 40 of FIG. 3 is assigned to each of the two communicating fax machines.

In a call between fax machines, a fax machine behaves as a source fax machine for some messages and as a destination fax machine for other messages. In the present invention, it is only necessary to describe the communication between a source fax machine and a collision prevention circuit without regard to the destination fax machine. Limiting the discussion to the source fax machine and the collision prevention circuit will allow a focused discussion of the present invention without loss of accuracy.

Figure 3:
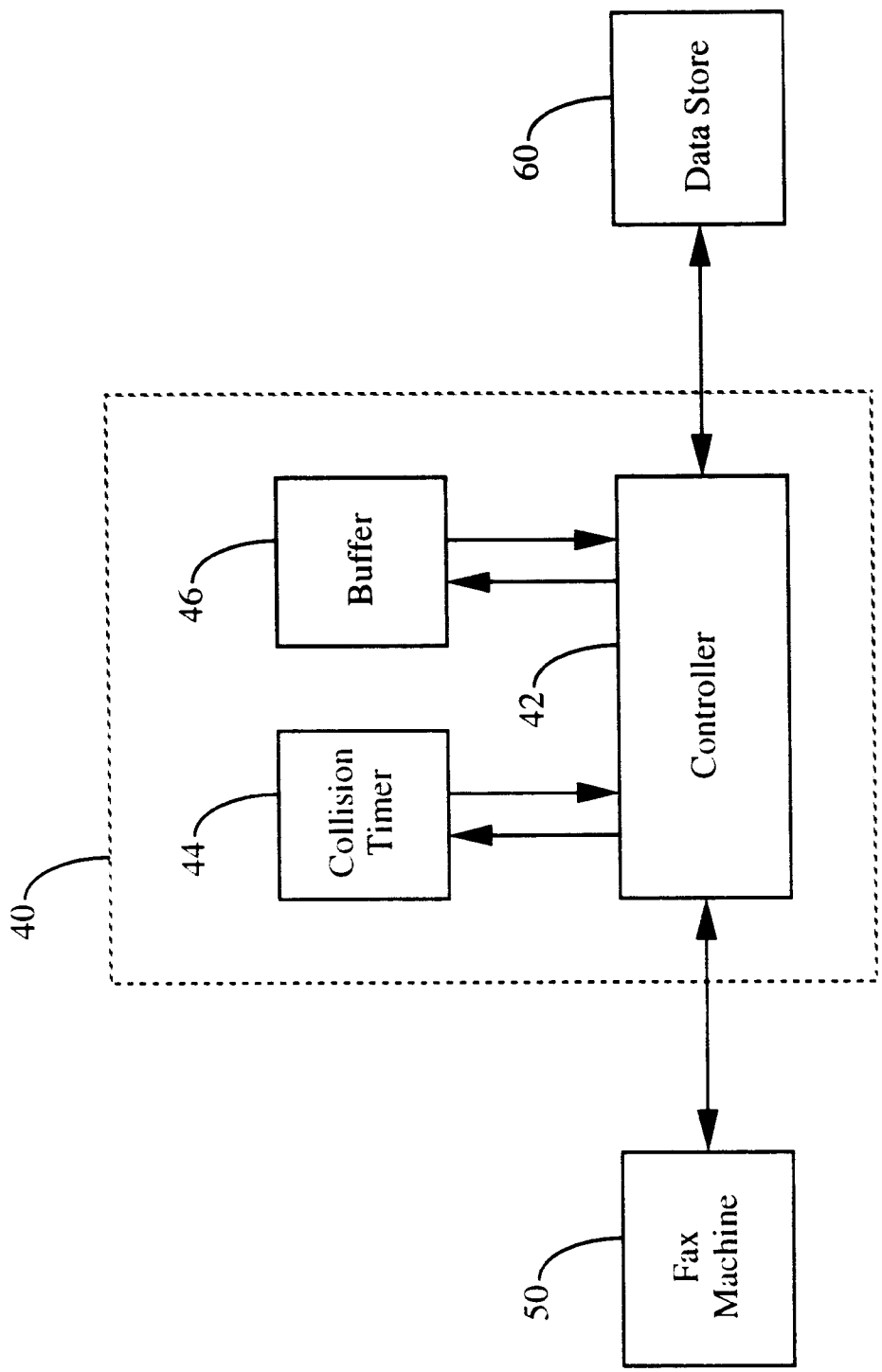
FIG. 3 is a block diagram of a timer based collision prevention circuit.

An exemplary timer based collision prevention circuit 40 is shown in FIG. 3. Fax machine 50 is a source fax machine which transmits a message to collision prevention circuit 40. Upon receiving the message from fax machine 50, collision prevention circuit 40 determines if the message will be retransmitted. Collision prevention circuit 40 makes this determination based upon the type of message just received and its apriori knowledge of past messages. If the message is to be repeated, collision prevention circuit 40 recognizes that fax machine 50 will retransmit the message at a later time but no earlier than the shortest repetition interval of 2.55 sec as specified by the T.30 fax protocol. Therefore, collision prevention circuit 40 expects a repeated message from fax machine 50 after 2.55 sec. Knowing this, collision prevention circuit 40 will only transmit a response to fax machine 50 within a predetermined timeout period of less than 2.55 sec. In the most preferred embodiment, the predetermined timeout period is 2.40 sec to account for other system processing delays. A response received by fax machine 50 within 2.55 sec of a prior transmission of the message will not collide with the retransmitted message.

The message from fax machine 50 is received by controller 42 which resides within collision prevention circuit 40. Controller 42 may be implemented in a microprocessor, a microcontroller, a digital signal processing (DSP) chip, or an ASIC programmed to perform the function as described. Upon determining that the message will be repeated, controller 42 sets collision timer 44 to a predetermined timeout period. The predetermined timeout period must be less than the shortest repetition interval. In the most preferred embodiment, a predetermined timeout period of 2.40 sec is selected for a fax machine operating in automatic mode although any timeout period shorter than 2.55 sec may be acceptable, depending on processing delays. Controller 42 monitors collision timer 44. If controller 42 needs to transmit a response to fax machine 50, controller 42 first checks collision timer 44. If collision timer 44 has not expired, controller 42 directs transmission of the response to fax machine 50. Otherwise, if collision timer 44 has expired and controller 42 does have a response to send to fax machine 50, controller 42 waits for fax machine 50 to retransmit the message before transmitting the response to fax machine 50. In this manner, controller 42 only transmits a response to fax machine 50 within the shortest repetition interval to avoid message collisions.

Data store 60 contains the communications between SSS phone 16 and base station 22. As such, data store 60 contains the messages between fax machine 50 and the peer fax machine (not shown in FIG. 3) with which fax machine 50 is in communication. Communications between fax machine 50 and the peer fax machine are stored in buffer 46 if immediate transmission of the messages is not possible because of potential for message collisions or other system considerations. Data store 60 and buffer 46 may be implemented using any storage elements or any number of memory devices such as RAM memory devices, latches or other types of memory devices that are known in the art.

Figure 4:
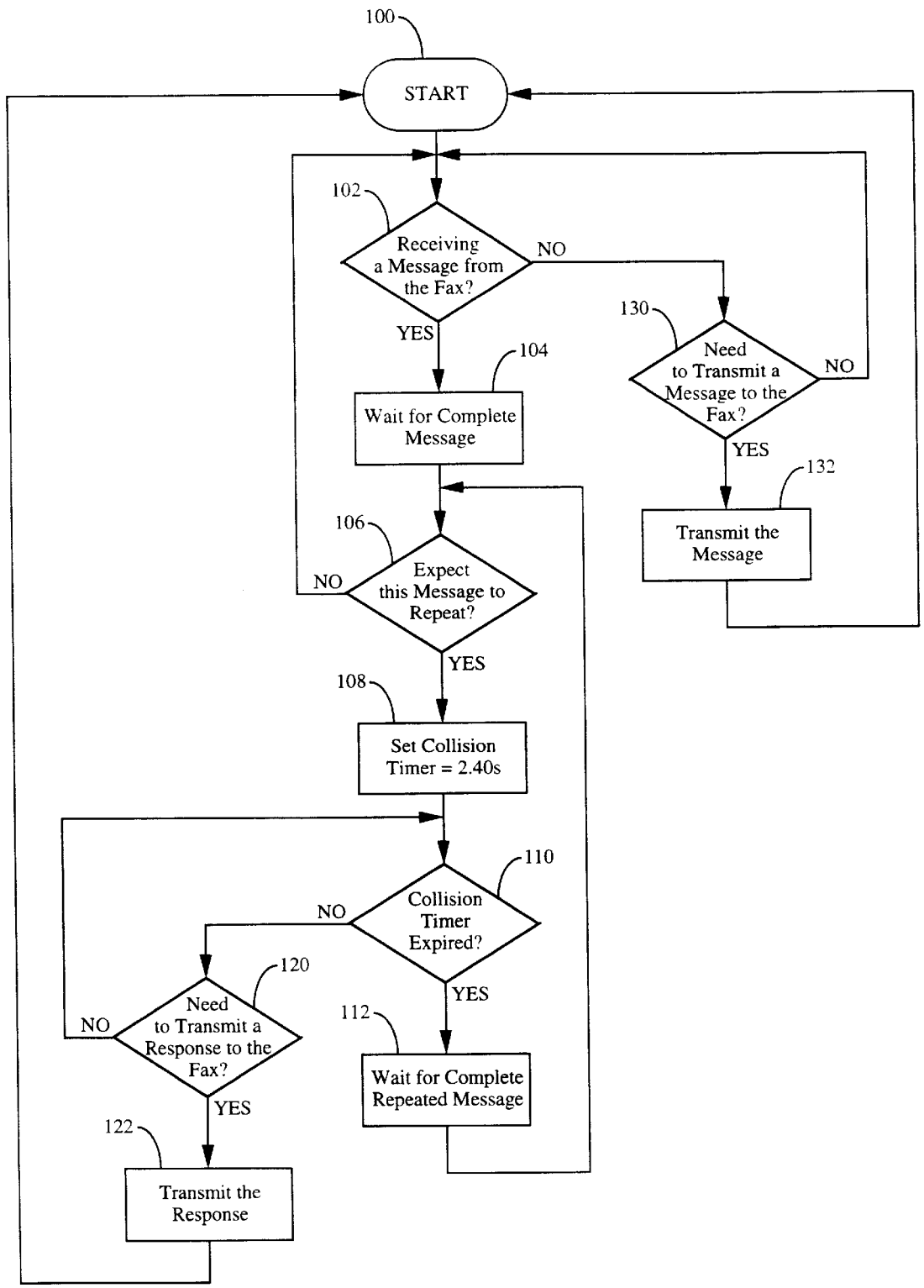
FIG. 4 is a flow diagram of a timer based collision prevention method of the present invention.

A flow diagram describing the operation of the timer based collision prevention method of the present invention is shown in FIG. 4. The discussion of the flow diagram is focused on the communication between a fax machine and the collision prevention circuit. Initially, the fax machine can be a source or a destination fax machine.

The present invention begins at start state 100. While sitting idle and awaiting a message from the fax machine, the present invention continually polls to see if a message is being received from the fax machine at step 102. If no message is being received, the present invention then determines whether it has a message to transmit to the fax machine at step 130. If there is a message to transmit to the fax machine, the present invention transmits the message at step 132. After transmission, the present invention returns to start state 100. If there is no message to transmit to the fax machine, the present invention returns to step 102 and continues to poll for messages from the fax machine.

If the present invention determines it is receiving a message from the fax machine, it waits for reception of the complete message at step 104. The fax machine is then considered the source fax machine for the message. After receiving the entire message, the present invention determines whether that message will be repeated by the fax machine by analyzing the state of the message based on the T.30 fax protocol at step 106. If the message is not to be repeated, the present invention does not perform any special function and returns to step 102. If the present invention determines that the message is to be repeated, the present invention sets a collision timer to a predetermined period of time shorter than the shortest repetition interval at step 108. In the preferred embodiment, the collision timer is set to a time period between 2.30 sec and 2.55 sec. In the most preferred embodiment, the collision timer is set to 2.40 sec which is shorter than the shortest repetition interval of 2.55 sec for a fax machine operating in automatic mode. The collision timer counts down from the set time to zero.

After setting the timer, the present invention enters another loop. Within this loop, the present invention first checks to see whether the collision timer has expired (reached zero) at step 110. If the collision timer has not expired, the present invention then determines whether a response needs to be transmitted to the fax machine at step 120. If there is a response to be transmitted, the present invention transmits the response at step 122. Upon transmission of the response, the present invention returns to start state 100.

If there is no response to transmit, the present invention returns to step 110 and continues to poll the collision timer. If the collision timer has expired, the present invention knows that the source fax machine will retransmit the message at any time from this point forward. The present invention expects a repeated message and, therefore, waits for receipt of the complete repeated message from the fax machine at step 112. Once the repeated message has been received, the present invention advances to state 106. The present invention then determines whether this new message will repeated at step 106.

In the exemplary embodiment, once the collision timer expires, the present invention waits for receipt of the repeated message before proceeding forward. If for any reason the expected repeated message is not received, the present invention may sit in this state indefinitely. In a second embodiment, a timeout timer is set once the collision timer expires. The present invention continually polls the timeout timer while it is waiting for the repeated message. If the timeout period expires and the expected repeat message has not arrived, the present invention aborts the wait and returns to start state 100.

The flow diagram of the exemplary embodiment assumes that only one response will be sent to the fax machine between repeating messages. An embodiment in which multiple responses are sent to the fax machine within the collision timer period is within the scope of the present invention. The flow diagram of FIG. 4 can be easily modified to express this embodiment.

The timer based collision prevention circuit in FIG. 3 and the flow diagram in FIG. 4 can be implemented in a variety of ways. The inventive concept can be implemented in hardware using a state machine, some memory, and a clock. The invention can also be implemented in firmware by microcode running on a microcomputer or a digital signal processor. Other implementations or a hybrid combination of implementations are within the scope of the present invention.

Although the exemplary embodiment is directed toward a fax communication system operating in a half-duplex manner over the PSTN, the inventive concept is applicable toward any communications between multiple devices using a half-duplex communication system. For example, the present invention can be directed toward communications between computers, fax machines, scanners, plotters, and printers, copiers, test equipment, and diagnostic equipment.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for preventing message collisions in a half-duplex communication system comprising:

receiving a first message from a communication device;

setting a countdown collision timer to a predetermined time period if said first message will be repeated; and sending a second message to said communication device only if said countdown collision timer has not expired;

wherein said predetermined time period is shorter than a shortest repetition interval in which said first message will be repeated and wherein said second message is a message or a response.

2. The method of claim 1 wherein said predetermined time period is less than 2.55 seconds.

3. The method of claim 1 further comprising:

waiting for a repeated message if said first message will be repeated and said countdown collision timer has expired; and resetting said countdown collision timer to said predetermined time period if said repeated message is received.

4. The method of claim 3 wherein said predetermined time period is less than 2.55 seconds.

5. The method of claim 3 further comprising:

setting a countdown timeout timer to a timeout period if said countdown collision timer has expired and said first message will be repeated; and aborting said waiting for said repeated message if said countdown timeout timer has expired.

6. An apparatus for preventing message collisions in a half-duplex communication system comprising:

a controller for receiving a first message from a communication device and sending a second message to said communication device, said second message being a message or a response; and a countdown collision timer connected to said controller;

wherein said controller sets said countdown collision timer to a predetermined time period that is shorter than a shortest repetition interval in which said first message would be repeated if said first message will be repeated and said controller transmits said second message to said communication device only if said countdown collision timer has not expired.

7. The apparatus of claim 6 wherein said predetermined time period is less than 2.55 seconds.

8. The apparatus of claim 6 further comprising:

a countdown timeout timer connected to said controller, said countdown timeout timer being set to a timeout period if said countdown collision timer has expired and said first message will be repeated.

9. The apparatus of claim 8 further comprising:

a buffer connected to said controller for storing said second message if immediate transmission to said communication device is not permitted.

* * * * *